United States Patent [19]
Connors et al.

[11] Patent Number: 5,898,772
[45] Date of Patent: Apr. 27, 1999

[54] LOGICAL PC AGENT

[75] Inventors: Paul A. Connors, Broomfield; Paul L. Richman, Boulder, both of Colo.

[73] Assignee: Lucent Technologies Inc., Murray Hill, N.J.

[21] Appl. No.: 08/865,042

[22] Filed: May 29, 1997

[51] Int. Cl.$^6$ .............................. H04M 3/42; H04M 3/22
[52] U.S. Cl. ..................... 379/265; 379/93.05; 379/201; 379/216; 379/354
[58] Field of Search ..................................... 379/201, 265, 379/142, 207, 216, 354, 355, 242, 93.05, 93.06, 267, 93.14

[56] References Cited

U.S. PATENT DOCUMENTS

| | | | |
|---|---|---|---|
| 4,747,127 | 5/1988 | Hansen et al. | 379/201 |
| 4,748,656 | 5/1988 | Gibbs et al. | 379/93.05 |
| 4,782,517 | 11/1988 | Bernardis et al. | 379/201 |
| 4,788,720 | 11/1988 | Brennan et al. | 379/201 |
| 4,897,866 | 1/1990 | Majmudar et al. | 379/201 |
| 5,001,710 | 3/1991 | Gawrys et al. | 379/265 |
| 5,008,930 | 4/1991 | Gawrys et al. | 379/210 |
| 5,239,460 | 8/1993 | LaRoche | 705/11 |
| 5,353,339 | 10/1994 | Scobee | 379/207 |
| 5,355,404 | 10/1994 | LeDuc et al. | 379/201 |
| 5,373,549 | 12/1994 | Bales et al. | 379/93.21 |
| 5,377,261 | 12/1994 | Baals et al. | 379/201 |
| 5,465,286 | 11/1995 | Clare et al. | 379/216 |
| 5,485,511 | 1/1996 | Iglehart et al. | 379/201 |
| 5,517,562 | 5/1996 | McConnell | 379/207 |
| 5,541,986 | 7/1996 | Hou | 379/201 |
| 5,544,236 | 8/1996 | Andruska et al. | 379/201 |

OTHER PUBLICATIONS

H. Newton, A Microsoft Fantasy, Computer Telephony, Jan./Feb. 1994, pp. 9, 10, 12, 15–16.

"Definity Communications System", Generic 3, Feature Description, vol. 1, AT&T 555–230–204CI, Issue 2, Sep. 1995, pp. 3–117–3–124 and pp. 3–826–3–830.

*Primary Examiner*—Scott Wolinsky
*Attorney, Agent, or Firm*—John C. MOran

[57] ABSTRACT

Allowing an agent to customize their CTI terminal with respect to a variety of terminal attributes such as those associated with previous phone activity, configuration information such as color, and graphical statistical representation of ACD center information. The telecommunication agent is able to store information defining this customization and to retrieve it at another CTI terminal at a later point in time. The storage of the customization information is performed as a file on a file server common to all CTI terminals. The result is that no software must be custom written for the file server in order to allow the saving of customized information. In addition, the programs controlling the CTI terminals are independent of the communication protocol that is utilized between the CTI terminals and the file server. A second embodiment of the invention allows the administrator of a call center to specify that each group of agents will utilize the same customization information. This group customization information is stored on each CTI terminal which reduces the real time load on the file server when a new agent work session starts. Also, each CTI terminal periodically polls the file server to see if a new set of group customization information has been stored on the file server. Call center administrators will routinely store new group customization information on the file server. If a new set of group customization information has been stored on the file server, the CTI terminal accesses this information and stores it internal to the CTI terminal.

21 Claims, 6 Drawing Sheets

LOGICAL PC AGENT

TECHNICAL FIELD

This invention relates to telephone switching systems.

BACKGROUND OF THE INVENTION

In the last decade or so, Computer Telephony Integration (CTI) has come to be employed with switching systems. A CTI terminal is a combination of a Personal Computer (PC) with an attached telephone. The PC is controlled by an application program. This application program emulates a voice terminal used in call centers such as a Callmaster or Callmaster II voice terminals. In addition to emulating a normal call center voice terminal, the PC application allows additional functions to be performed. The PC is interconnected to the switching system utilizing normal telephone communication links. The switching system is programmed to consider the CTI terminal as an ordinary call center voice terminal. In addition, the CTI terminal is interconnected to a file server or client server which provides the CTI terminal database information. CTI terminals have been especially used in call centers. Call centers are systems that enable a group of agents to serve incoming and/or outgoing calls, with the calls being distributed and connected to whichever of the agents happen to be available at the time of the call. The call/distribution function is commonly referred to as Automatic Call Distribution (ACD) is generally implemented in software that executes either in a stored program controlled switching system, such as a Private Branch Exchange (PBX) or in an adjunct processor of the switching system.

In most ACD centers, the number of telecommunication agents is greater than the number of CTI terminals. This occurs since an ACD center is normally active at least 16 hours a day if not 24 hours so there are two or three shifts of telecommunication agents. In addition, some ACD centers schedule breaks of the telecommunication agents such that within a shift there may be more telecommunication agents than available CTI terminals. The result is that often a telecommunication agent will use many different CTI terminals over the course of time. This means that telecommunication agents cannot customize the CTI terminals for their personal needs unless they do it for each CTI terminal.

SUMMARY OF THE INVENTION

This invention is directed to solving these and other problems and disadvantages of the prior art. In accordance with the invention, an agent can customize their CTI terminal with respect to a variety of terminal attributes such as those associated with previous phone activity, configuration information such as color, and graphical statistical representation of ACD center information. The telecommunication agent is able to store information defining this customization and to retrieve it at another CTI terminal at a later point in time. Advantageously, the storage of the customization information is performed as a file on a file server common to all CTI terminals. The result is that no software must be custom written for the file server in order to allow the saving of customized information. In addition, the programs controlling the CTI terminals are independent of the communication protocol that is utilized between the CTI terminals and the file server.

A second embodiment of the invention allows the administrator of a call center to specify that each group of agents will utilize the same customization information. Advantageously, this group customization information is stored on each CTI terminal which reduces the real time load on the file server when a new agent work session starts. Also, each CTI terminal periodically polls the file server to see if a new set of group customization information has been stored on the file server. Call center administrators will routinely store new group customization information on the file server. If a new set of group customization information has been stored on the file server, the CTI terminal accesses this information and stores it internal to the CTI terminal.

DETAILED DESCRIPTION

Figure 1:
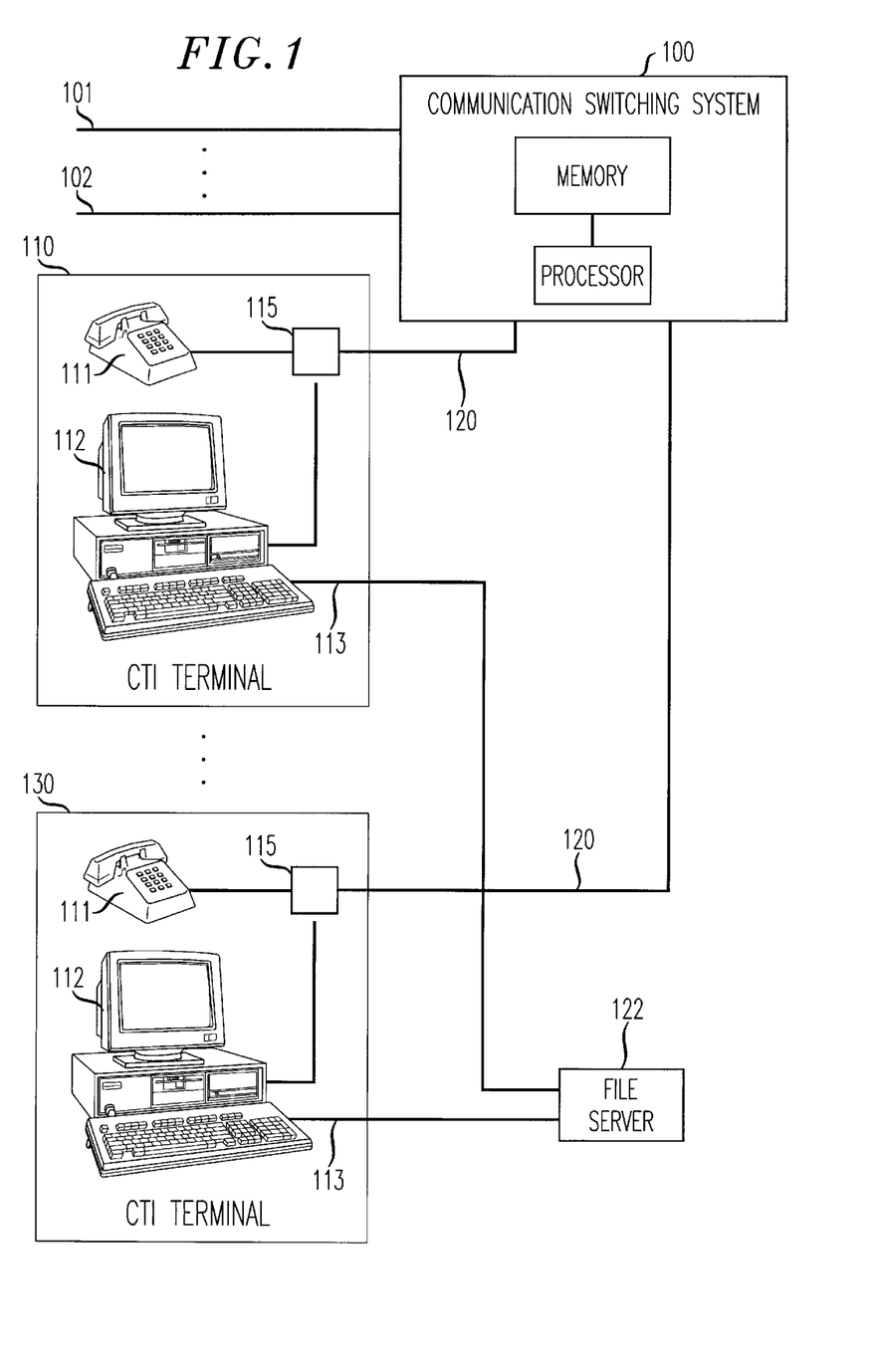
FIG. 1 is a block diagram of a telecommunication system that embodies the invention.

FIG. 1 illustrates, in block diagram form, a telecommunication system which may be a call center or a private telephone system. Communication switching system 100 is interconnected to the public telephone system via trunks 101 through 102. Communication switching system 100 interconnects and provides various communication features to computer telephone terminals (CTI) 110 through 130. In an ACD center, CTI terminals 110 through 130 are utilized by agents to provide call center service to calls being received on trunks 101 through 102. Each CTI terminal emulates a conventional terminal such as the Lucent Technologies Call Master II terminal providing the features of that terminal plus additional functions. CTI terminal 110 comprises data terminal 112 which advantageously is a personal computer, and conventional telephone 111. Data terminal 112 is connected to the same communication link as telephone 111 by interface 115 as taught by U.S. Pat. No. 4,748,656. Illustratively, interface 115 is the AT&T Passage Way device or the AT&T PC/PBX Connection device. In addition, each CTI terminal is interconnected to file server 122 via links 113. Links 113 maybe individual links or a local area network (LAN).

When a telecommunication agent starts to use a CTI terminal, the agent first requests administration information from communication switching system 100 via link 120. The administration information advantageously consists of three items: (1) system parameters, (2) switch feature access codes, and (3) terminal button assignments. Communication switching system 100 transmits to CTI terminal 110 all of the possible terminal button assignments that have been administered for link 120. After receiving the stored administration information from communication switching system 100, the agent using CTI terminal 110 accesses file server 122 via link 113 and obtains the customization information for that agent's CTI terminal. The customization information had been previously stored on file server 122 by the agent at the end of the agent's last work session. File server 122 can be controlled by any of a variety of commercially available operating systems without effecting the operation of CTI terminal 110 since CTI terminal 110 is simply requesting a file from file server 122.

Figure 2:
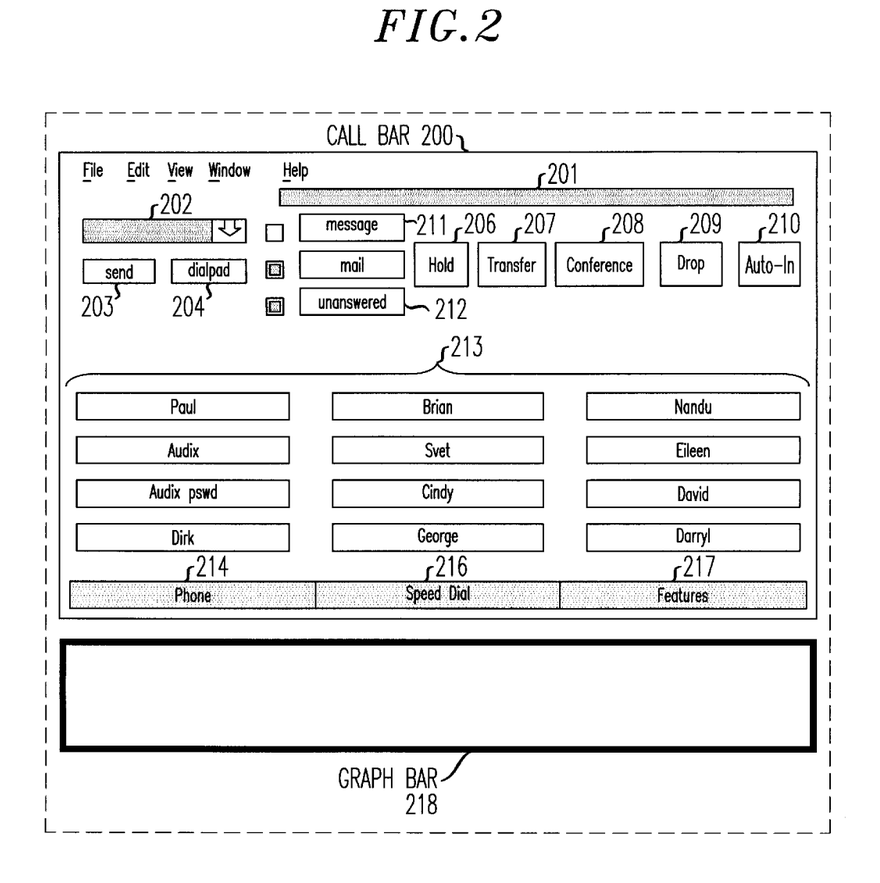
FIG. 2 illustrates a typical screen of information on a CTI terminal.

The customization information with respect to terminal activity data consists of the call log of the agent defining calls that were placed or received by the agent during their previous work session and the most recently dialed numbers of the agent. With respect to configuration information, the customization information consists of buttons being utilized by the agent, color schemes used to display information on the CTI terminal, text labels, and a speed dialing list. In addition, the customization information consists of a graph bar that is predefined by a center administrator. The graph bar is utilized to display center statistics to the agent. Finally, the criterion action information is downloaded to the CTI terminal. The criterion action information defines the criteria that the agent's pool will be measured against during the present work session. FIG. 2 illustrates a display of the information that is transferred to CTI terminal 110 during the retrieval of customization information from file server 122. One skilled in the art could readily envision that other types of information could be stored and retrieved from file server 122 to further customize CTI terminal 110.

FIG. 2 illustrates the monitor of data terminal 112 after the customized information has been transferred from file server 122 to CTI terminal 110. FIG. 2 merely illustrates one of a plurality of different configurations that could have been contained within the customized information received from file server 122. Call bar 200 and graph bar 218 are displayed on the monitor. Graph bar 218 has the customized information that is set up by the system administrator. Call bar 200 can have one of three configurations displayed. These three configurations are determined by the selection of buttons 214, 216 and 217. As illustrated in FIG. 2, button 216, Speed Dial, has been selected, and the speed dialing buttons 213 are displayed. If button 214, Phone, is selected then a different set of buttons is displayed pertaining to different types of telephone operations. Similarly, if button 217, Features, is selected, then the additional features available to the agent are displayed in place of buttons 213. Display box 201 is utilized by the agent to directly type in telephone numbers, etc. Box 202 is a drop down box which when selected displays the most recently called number list of the agent. Buttons 203–212 perform other telephone features or agent terminal operations. One skilled in the art could readily envision other types of displays that could be utilized.

Figure 3:
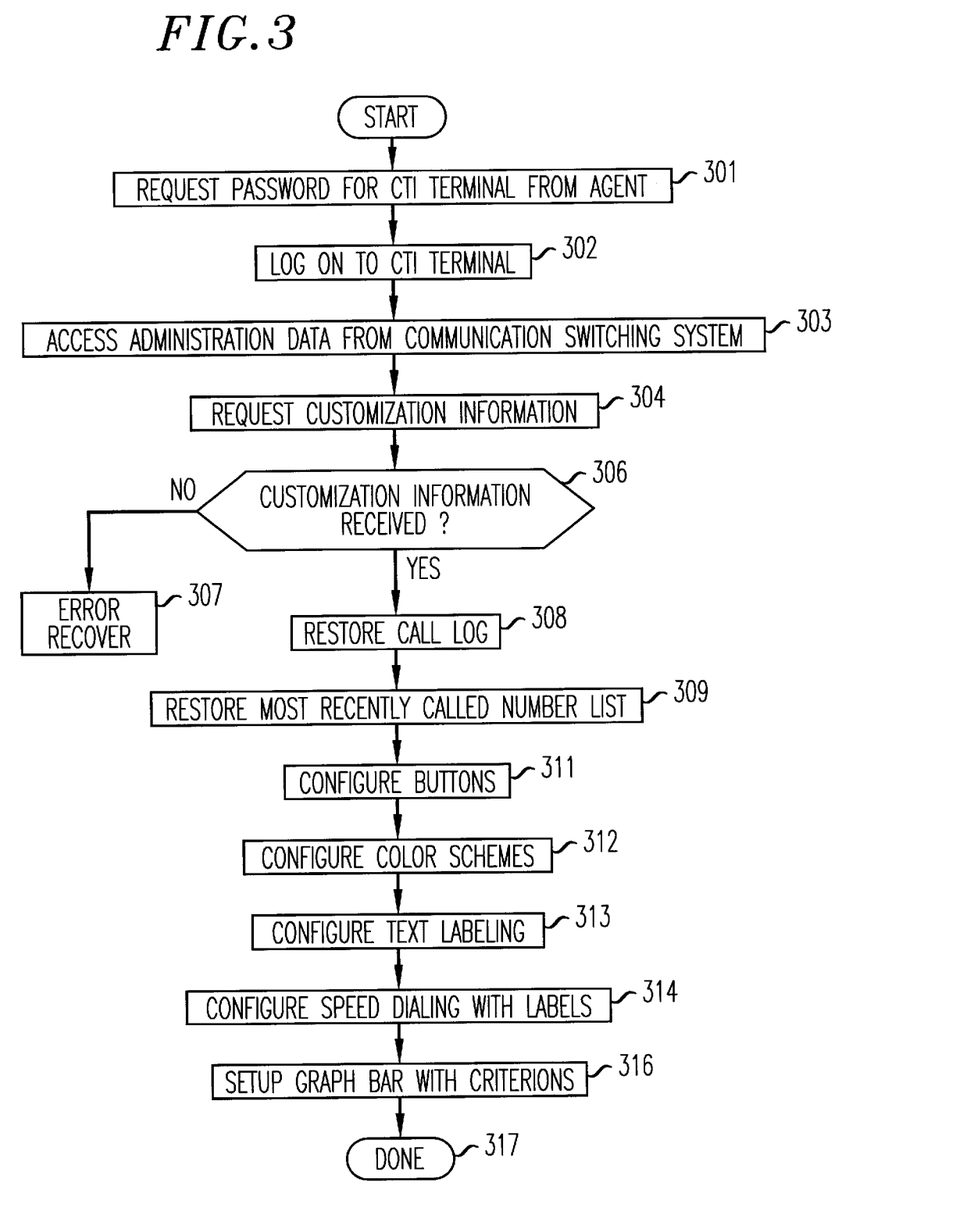
FIG. 3 illustrates, in flow chart form, steps performed by a CTI terminal in accessing a file server to receive customization information.

FIG. 3 illustrates the steps performed by CTI terminal 110 in the previous example. First, block 301 then requests the password from the agent so that the agent can be logged onto CTI terminal 110. Block 302 logs the user on utilizing the password received in block 301. Block 303 accesses communication switching system 100 to obtain the administration data. The manner in which this accessing is performed is set forth in U.S. patent application, Ser. No. 08/742,788, filed Oct. 31, 1996, entitled "Telecommunication Feature for Exchange of Translation Information Between a Computer and a Telecommunication Switching System". This U.S. patent application is hereby incorporated by reference. Block 304 requests the customization information from file server 122. Decision block 306 determines if the customization information has been received. If the customization information is not received, error recovery is performed by block 307. If the customization information is received, control is transferred to block 308 which restores the call log of the agent on CTI terminal 110. The call log reflects the calls that the agent had made or received during the previous work session. Block 309 then restores the most recently called number list on CTI terminal 110. Block 311 configures the buttons to match the configuration previously established by the agent. The administration data received in block 303 defines all of the button appearances that are possible. Block 311 chooses only those feature buttons that the agent had previously specified as being desired by the agent. Block 311 makes the translations between the button that appears on the screen of CTI terminal 110 and the message that must be transmitted to communication switching system 100 via link 120 to activate the function specified by that feature button.

Block 312 configures the various color schemes that had been set up by the agent during a previous work station. Block 313 labels and establishes on the screen of CTI terminal 110 the various labels. The speed dialing list and its associated labels are set up from the customization information by block 314. Block 316 configures the graphs that will be displayed on the graph bar as illustrated in FIG. 2. The graphs are specified by the call center administrator and include the various criterions that must be met by the pool of agents to which the agent utilizing CTI terminal 110 belongs for this work session. The graphs on the graph bars can be set up so that as a criterion is not met or is met the colors of the graph will change so as to immediately alert the agent. After execution of block 316, block 317 is executed and the set up of CTI terminal 110 is completed.

Figure 4:
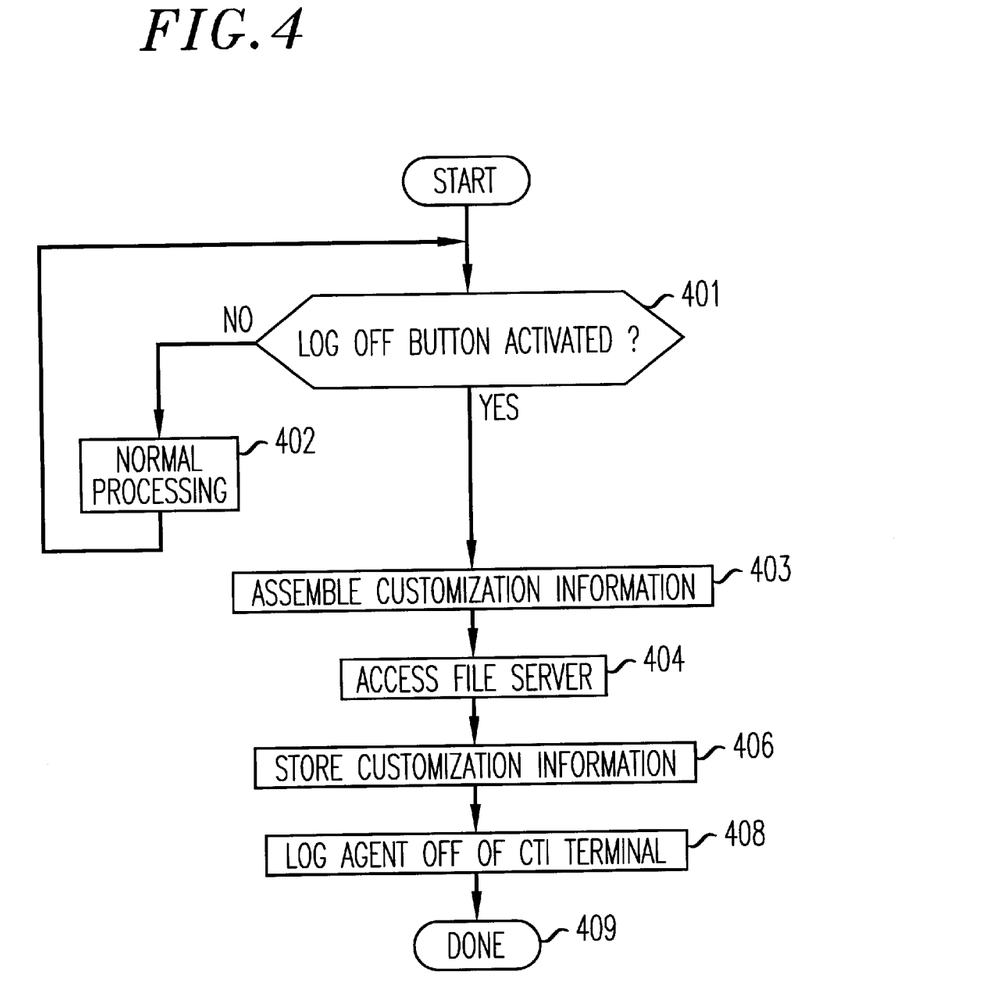
FIG. 4 illustrates, in flow chart form, steps performed by a CTI terminal in logging off of a work session.

FIG. 4 illustrates the operations performed when the agent logs off of CTI terminal 110. Decision block 401 determines if the log off button has been activated by the agent. If the answer is no, block 402 performs normal processing before returning control back to decision block 401. If the answer is yes in decision block 401, block 403 assembles the customization information from the various sources within CTI terminal 110. Block 404 then accesses file server 122. Block 406 stores the customization information into the agent's file on file server 122. Block 408 logs the agent off of CTI terminal 110 before transferring control to block 409 which indicates the completion of the log off operation.

Figure 5:
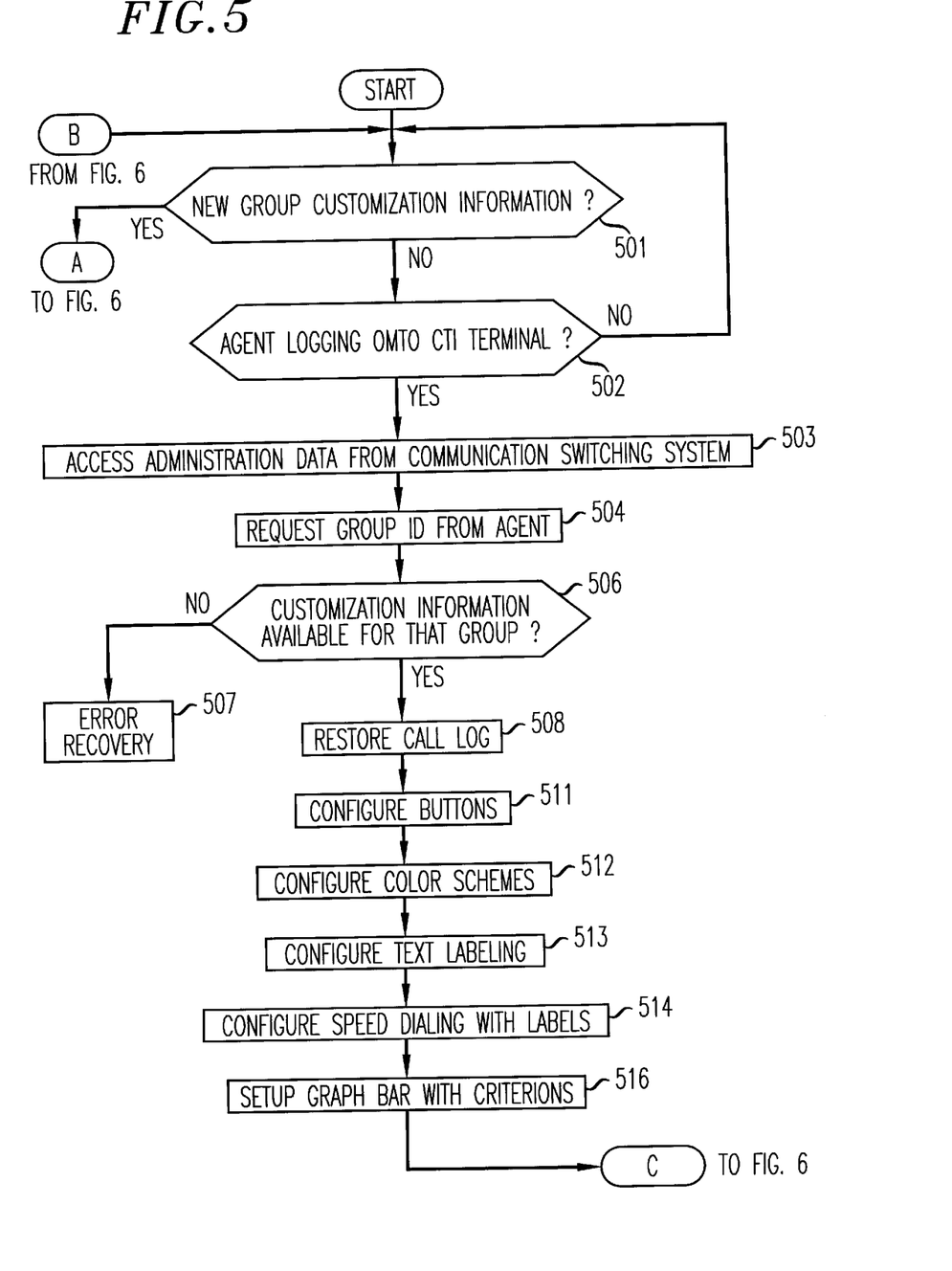
FIGS. 5 and 6 illustrate, in flow chart form, steps performed by a CTI terminal in a second embodiment of the invention.
Figure 6:
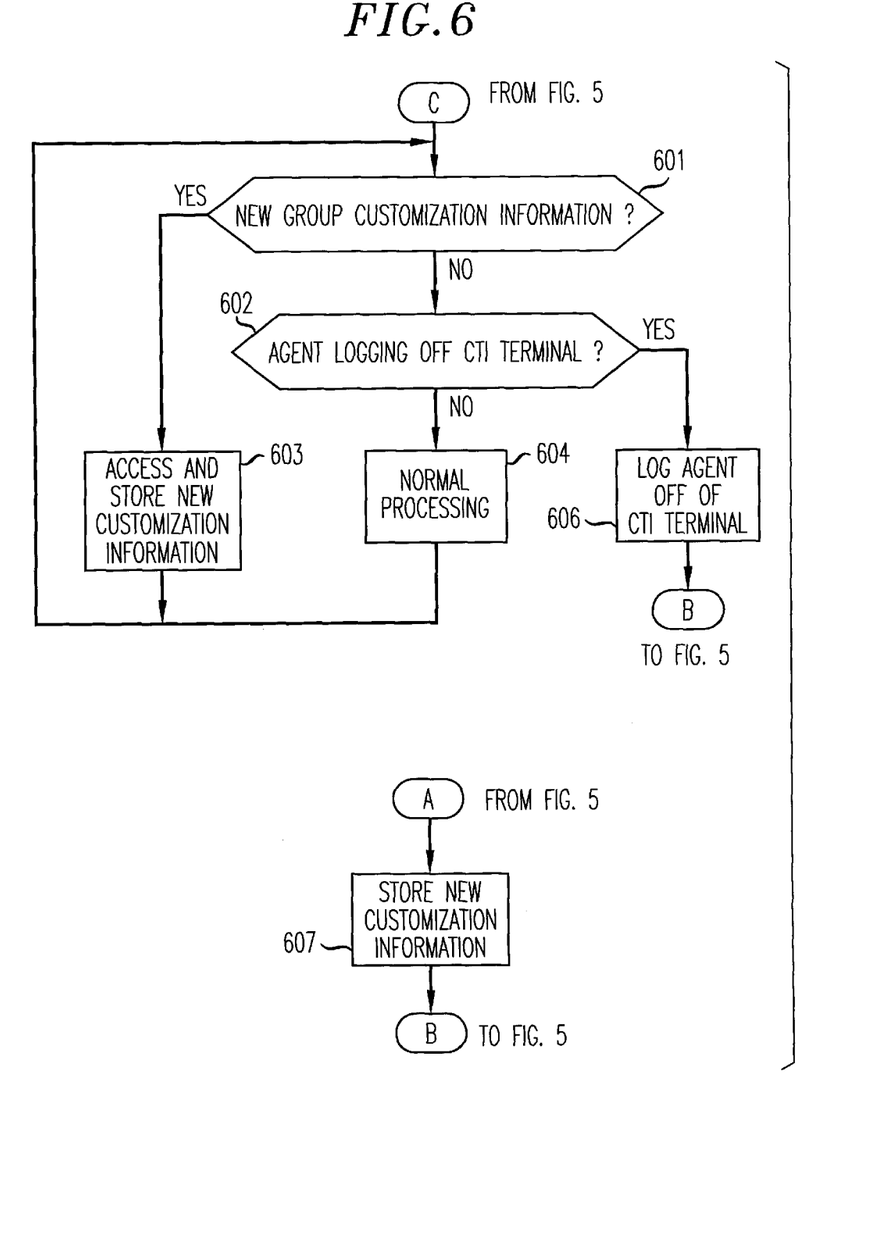

A second embodiment of the invention is described with respect to FIGS. 5 and 6. The second embodiment of the invention is directed to the situation where the administrator of the automatic call distribution system does not wish each agent to have their own customization information. Rather, the customization information is determined for each group of agents where each group works on a common call center task. The advantage of the second embodiment is that the customization information for all groups of agents are stored on each individual CTI terminal, rather than the customization information being stored on file server 122. The result is that when a new work session starts, a large real time burden is not placed on file server 122 to distribute to each agent their customization information. It is necessary for each CTI terminal to periodically check if new group customization information has been stored on file server 122. If new group customization information has been stored in file server 122, then the CTI terminal must download and store this information.

FIG. 5 illustrates the steps performed by a CTI terminal, such as CTI terminal 110, when an agent logs into the CTI terminal. Decision block 501 determines if there is new group customization information on file server 122. If the answer is no, decision block 502 determines if an agent is logging onto the CTI terminal. If the answer is no in decision block 502, control is transferred back to decision block 501. If the answer in decision block 502 is yes, block 503 accesses the administration data from communication switching system 100 before transferring control to block

504. The latter block requests the group ID that the agent is using. The group ID identifies the group customization information. After execution of block 504, decision block 506 determines if the customization information for the requested group is available within the CTI terminal. If the answer is no, control is transferred to block 507 for error recovery.

If the customization information is available for this group, control is transferred to block 508 which restores the call log of the group on CTI terminal 110. The call log will reflect the calls that the agent will make or receive during this work session. Block 511 configures the buttons to match the configuration previously established for this group. The administration data received in block 503 defines all of the button appearances that are possible. Block 511 chooses only those feature buttons that have been specified for this group. Block 511 makes the translations between the button that appears on the screen of CTI terminal 110 and the message that must be transmitted to communication switching system 100 via link 120 to activate the function specified by that feature button.

Block 512 configures the various color schemes. Block 513 labels and establishes on the screen of CTI terminal 110 the various labels. The speed dialing list and its associated labels are set up from the customization information by block 514. Block 516 configures the graphs that will be displayed on the graph bar as illustrated in FIG. 2. The graphs are specified by the call center administrator and include the various criterions that must be met by the pool of agents to which the agent utilizing CTI terminal 110 belongs for this work session. The graphs on the graph bars can be set up so that as a criterion is not met or is met the colors of the graph will change so as to immediately alert the agent. After execution of block 516, the set up of CTI terminal 110 is complete, and control is transferred to block 601 of FIG. 6.

Blocks 601–606 are executed after the agent has logged into a CTI terminal as was previously described with respect to FIG. 5. Decision block 601 determines whether new group customization information is available on file server 122. If the answer is yes, block 603 accesses the new customization information from file server 122 and stores it internal to the CTI terminal before returning control back to decision block 601. Returning to decision block 601, if the answer is no, control is transferred to decision block 602. The latter decision block determines if the agent is logging off the CTI terminal. If the answer is yes, block 606 logs the agent off of the CTI terminal and returns control to decision block 501 of FIG. 5. If the answer is no in decision block 602, block 604 performs the normal processing for the CTI terminal.

Returning to decision block 501 of FIG. 5. If the answer is yes in decision block 501, control is transferred to block 607 of FIG. 6 where the CTI terminal accesses and the new customization information from file server 122 and internally stores this new customization information. After execution of block 607, control is transferred back to decision block 501 of FIG. 5.

It is to be understood that the above-described embodiments are merely illustrative of principles of the invention and that other arrangements may be devised by those skilled in the art without departing from the spirit or scope of the invention.

What is claimed is:

1. A method for initializing one of a plurality of telecommunication terminals from a telecommunication switching system and a computer to customize user functionality among a plurality of users where the telecommunication switching system and computer are providing automatic call distribution operations, comprising the steps of:

accessing administration information comprising system parameters, switch feature access codes and terminal button assignments by the one of the plurality of telecommunication terminals from the telecommunication switching system via a first link;

storing the accessed administration information by the one of the plurality of telecommunication terminals;

setting up the one of plurality of telecommunication terminals with the accessed administration information;

accessing customize user functionality information for the one of the plurality of users from the computer by the one of the plurality of telecommunication terminals via a second link;

storing the accessed customize user functionality information by the one of the plurality of telecommunication terminals; and updating the one of the plurality of telecommunication terminals with the stored customize user functionality information.

2. An apparatus that executes all of the steps of claim 1.

3. The method of claim 1 wherein the step of updating comprises the steps of restoring a call log for the one of the plurality of users on the one of the plurality of telecommunication terminals; and restoring a most recently dialed numbers list for the one of the plurality of users on the one of the plurality of telecommunication terminals.

4. An apparatus that executes all of the steps of claim 3.

5. The method of claim 3 wherein the step of updating further comprises the steps of restoring customized button information on the one of the plurality of telecommunication terminals;

restoring display color schemes on the one of the plurality of telecommunication terminals; and restoring a speed dialing list including dialed number information and button label information on the one of the plurality of telecommunication terminals.

6. An apparatus that executes all of the steps of claim 5.

7. The method of claim 5 wherein the step of updating further comprises the step of restoring graph bar configuration information on the one of the plurality of telecommunication terminals.

8. An apparatus that executes all of the steps of claim 7.

9. The method of claim 7 further comprises the steps of detecting by the one of the plurality of telecommunication terminals that the one of the plurality of users is logging off of the one of the plurality telecommunication terminals;

assembling the customize user functionality information stored on the one of the plurality of telecommunication terminals including any modifications to the customize user functionality information made by the one of the plurality of users; and storing the customize user functionality information with modifications on the computer.

10. An apparatus that executes all of the steps of claim 9.

11. The method of claim 7 wherein the computer is a file server and the step of accessing the customize user functionality information comprises the step of reading a file from the file server utilizing only standard programs on the file server thereby requiring no custom programs be installed on the file server to function with the plurality of telecommunication terminals.

12. An apparatus that executes all of the steps of claim 11.

13. The method of claim 1 wherein the step of accessing the computer is performed over said second link which is a local area network; and the step of accessing the telecommunication switching system is performed over said first link which is a communication link.

14. An apparatus that executes all of the steps of claim 13.

15. A method for initializing one of a plurality of telecommunication terminals from a telecommunication switching system and a computer to customize user functionality among a plurality of users where the telecommunication switching system and computer are providing automatic call distribution operations, comprising the steps of:

accessing administration information comprising system parameters, switch feature access codes and terminal button assignments by the one of the plurality of telecommunication terminals from the telecommunication switching system;

storing the accessed administration information by the one of the plurality of telecommunication terminals;

setting up the one of plurality of telecommunication terminals with the accessed administration information;

obtaining group identification information from one of the plurality of users;

accessing internally stored customize group functionality information using the group identification information by the one of the plurality of telecommunication terminals;

updating the one of the plurality of telecommunication terminals with the accessed customize group functionality information;

determining periodically by the one of the plurality of telecommunication terminals if new customize group functionality information has been stored on the computer; and accessing and internally storing the new customize group functionality information using the group identification information by the one of the plurality of telecommunication terminals upon the determination that such new customize group functionality information has been stored on the computer.

16. An apparatus that executes all of the steps of claim 15.

17. The method of claim 15 wherein the step of updating comprises the step of restoring a call log for the plurality of users on the one of the plurality of telecommunication terminals.

18. The method of claim 17 wherein the step of updating further comprises the steps of restoring customized button information on the one of the plurality of telecommunication terminals;

restoring display color schemes on the one of the plurality of telecommunication terminals; and restoring a speed dialing list including dialed number information and button label information on the one of the plurality of telecommunication terminals.

19. The method of claim 18 wherein the step of updating further comprises the step of restoring graph bar configuration information on the one of the plurality of telecommunication terminals.

20. The method of claim 19 wherein the computer is a file server and the step of determining the new customize group functionality information comprises the step of reading a file from the file server utilizing only standard programs on the file server thereby requiring no custom programs be installed on the file server to function with the plurality of telecommunication terminals.

21. The method of claim 15 wherein the step of accessing the computer is performed over a local area network; and the step of accessing the telecommunication switching system is performed over a communication link.

* * * * *